Jan. 20, 1931.   K. R. SJOGREN   1,789,601

CHUCK

Filed June 6, 1929

INVENTOR.
Knut R. Sjogren
BY
Robt. W. Pearson
ATTORNEY.

Patented Jan. 20, 1931

1,789,601

UNITED STATES PATENT OFFICE

KNUT R. SJOGREN, OF LOS ANGELES, CALIFORNIA

CHUCK

Application filed June 6, 1929. Serial No. 368,936.

This invention relates to the construction of a machine chuck adapted either to secure the work on a live spindle or to maintain it upon a stationary support.

An object of the invention is to provide a more quickly and easily operable means for gripping and releasing the work mounted upon the chuck.

Another object of the invention is, in general, to simplify and stabilize the construction of a chuck.

Still other objects of the invention are to provide a chuck which is self-contained, one which requires no special tools for its operation and one which, while attaining the desired ends which have been mentioned may, nevertheless, be manufactured at a low cost.

Other objects and advantages may hereinafter appear.

Referring to the accompanying drawings, which illustrate what is at present deemed to be a preferred embodiment of the invention, Fig. 1 is a back view of the device.

Figure 1:
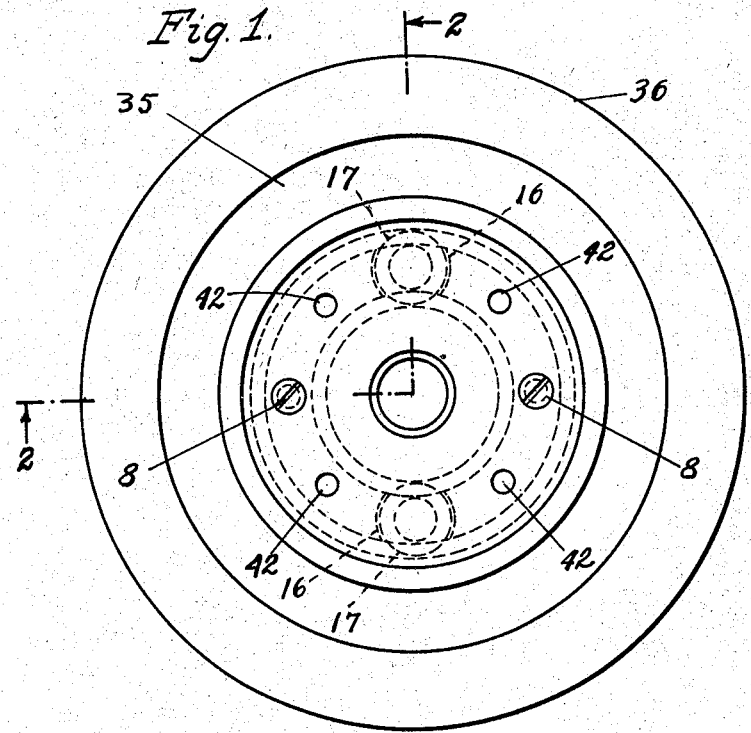

Referring in detail to the drawings, the tapered chuck head 5 is provided around the base of its taper with an external flange or shoulder 6. The flanged end of said head 5 is attached to an annular back plate 7 by means of screws 8. The lathe head 10 is indicated in dotted lines.

Said chuck head 5 has therethrough an axial bore 11 which is provided with an enlarged back portion 12, thus forming an annular shoulder 13 between said bore portions 11 and 12.

Figures 2, 3:
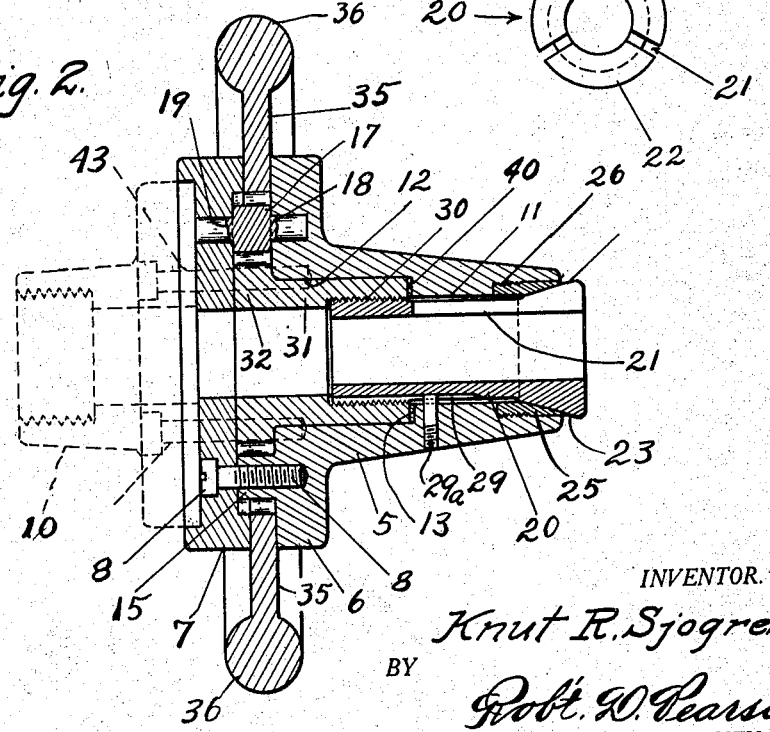
Fig. 2 is a cross section on angular line 2—2 of Fig. 1.
Fig. 3 is a front end view of the jaw member.

The back end of chuck head 5 is furnished with a broad annular rise 15 which is provided with a plurality (in the present instance two diametrically opposite) of cut away portions 16 in each of which is located an idler gear wheel 17 having a front trunnion 18 and a back trunnion 19, said trunnions rotating in seats provided for them in the head 5 and back-plate 7 as shown in Fig. 2.

The tubular jaw member 20 is made of resilient metal and has a plurality of deep slots 21 cut into its front end, thereby segregating from each other the jaw elements 22, three in number in the illustrated embodiment of the invention. Each of said jaw elements or jaws proper, is thickened throughout its front portion, being there shaped in such a manner as to provide an exterior inclined face 23. When the jaw is retracted, as will later be described, these inclines 23 engage the inner surface of a bushing or sleeve 25 which has an inside bevel at its front end, which is provided with an externally threaded portion 26 to screw into the front end of the chuck head 5. The bore 11 of the head 5 is enlarged at its front end to receive said sleeve 25 and to cause the internal diameter of said sleeve to aline with the body portion of the bore.

The inner end of jaw member 20 is longitudinally movable and is provided with a spline 29 and key 29a which keeps it from rotating. Said jaw member has at its inner or back end an externally screw threaded portion 30 over which screws the sleeve extension 31 of an externally toothed gear wheel 32, the teeth of which mesh with the idler gears 17 already mentioned. Said idler gears 17 are, in turn in mesh with an internally toothed annular gear 35 which is externally shaped as a hand wheel, being provided with a hand hold portion or rim 36.

It will be seen that by providing the idler gears 17 intermediate the hand wheel 35 and the internally threaded gear wheel 31, it is possible to bring the screw threaded connection between the internal part 30 of the jaw carrying member 20 and the gear wheel 31 nearer to the center of the chuck, thus obtaining a greater leverage where the screw threaded connection is made. The screw threaded connection is adapted to wear longer and withstand heavy stress because the threads of the part 30 and also of the part 31 extend completely around the axis of the chuck.

A chafing ring 40 is placed upon shoulder 13. Machine bolts 8 secure head 5 to back plate 7, and screw threaded holes 42 are provided to receive cap screws 43, one of which is shown in dotted lines in Fig. 2.

Claims:

1. In a chuck, a jaw member comprising a slidable, non-rotatable sleeve of resilient material, said sleeve having slits opening out at one end thereof, the spaces between said slits constituting jaw elements, said sleeve having an externally screw threaded portion, a rotatable annular gear having internal threads which engage the threads of said sleeve to extend and retract it, idler gears engaging said annular gear externally, a hand wheel having internal gear teeth in engagement with the gear teeth of said idler gears, and means to support the aforementioned parts in an operative relation to each other, said jaw elements being provided with inclined portions operatively related to said supporting means to impart to them a closing movement when the aforementioned sleeve is retracted.

2. In a chuck, a plurality of co-operating slidable gripping jaws arranged concentrically with respect to the axis of rotation of the chuck, said jaws being provided with exterior surfaces which are inclined axially of the chuck, a common non-rotatable support for said slidable jaws, said support having an externally screw threaded portion, a rotatable annular gear wheel having internal screw threads engaging the screw threads of said jaw support, a hand wheel having internal gear teeth in radially spaced relation to said annular gear, a plurality of idler gears positioned between the gear teeth of said hand wheel and of said annular gear to transmit rotation from the former to the latter, and means to engage the aforementioned inclined jaw surfaces to impart a closing movement to said jaws when said hand wheel is rotated in one direction and permitting said jaws to open when said hand wheel is rotated in the other direction, the aforementioned common support for said jaws being resilient and continually tending to separate said jaws.

3. In a chuck, a plurality of co-operating slidable gripping jaws arranged concentrically with respect to the axis of rotation of the chuck, said jaws being provided with exterior surfaces which are inclined axially of the chuck, a non-rotatable support for said slidable jaws, said support having an externally screw threaded portion, a rotatable annular gear wheel having internal screw threads engaging the screw threads of said jaw support, a hand wheel having internal gear teeth in radially spaced relation to said annual gear, a plurality of idler gears positioned between the gear teeth of said hand wheel and of said annular gear to transmit rotation from the former to the latter, and a bushing mounted axially within the chuck and having an internal face to engage the aforementioned inclined jaw surfaces to impart a closing movement to said jaws when said hand wheel is rotated in one direction and permitting said jaws to open when said hand wheel is rotated in the other direction, the aforementioned common support for said jaws being resilient and continually tending to separate said jaws.

4. In a chuck, a plurality of cooperating jaws arranged around the axis of the chuck, non-rotatable slidable jaw supporting means for said jaws, said jaw supporting means having resilient elements tending to separate said jaws from each other, said jaw supporting means being provided with external threads, a rotatable annular gear having internal threads which engage the threads of said jaw supporting means to extend and retract it, idler gears engaging said annular gear externally, a hand wheel having internal gear teeth in engagement with the gear teeth of said idler gears, and means to support the aforementioned parts in an operative relation to each other, said jaws being provided with inclined portions operatively related to said supporting means to impart to them a closing movement when the aforementioned jaw supporting means is retracted.

In testimony whereof I hereby affix my signature.

KNUT R. SJOGREN.